Dec. 14, 1965    H. STRUCK    3,222,815
TETHERED MODEL AIRPLANE FOR STUNT PERFORMANCE
Filed April 13, 1964    3 Sheets-Sheet 1

INVENTOR.
Henry Struck
BY
ATTORNEY.

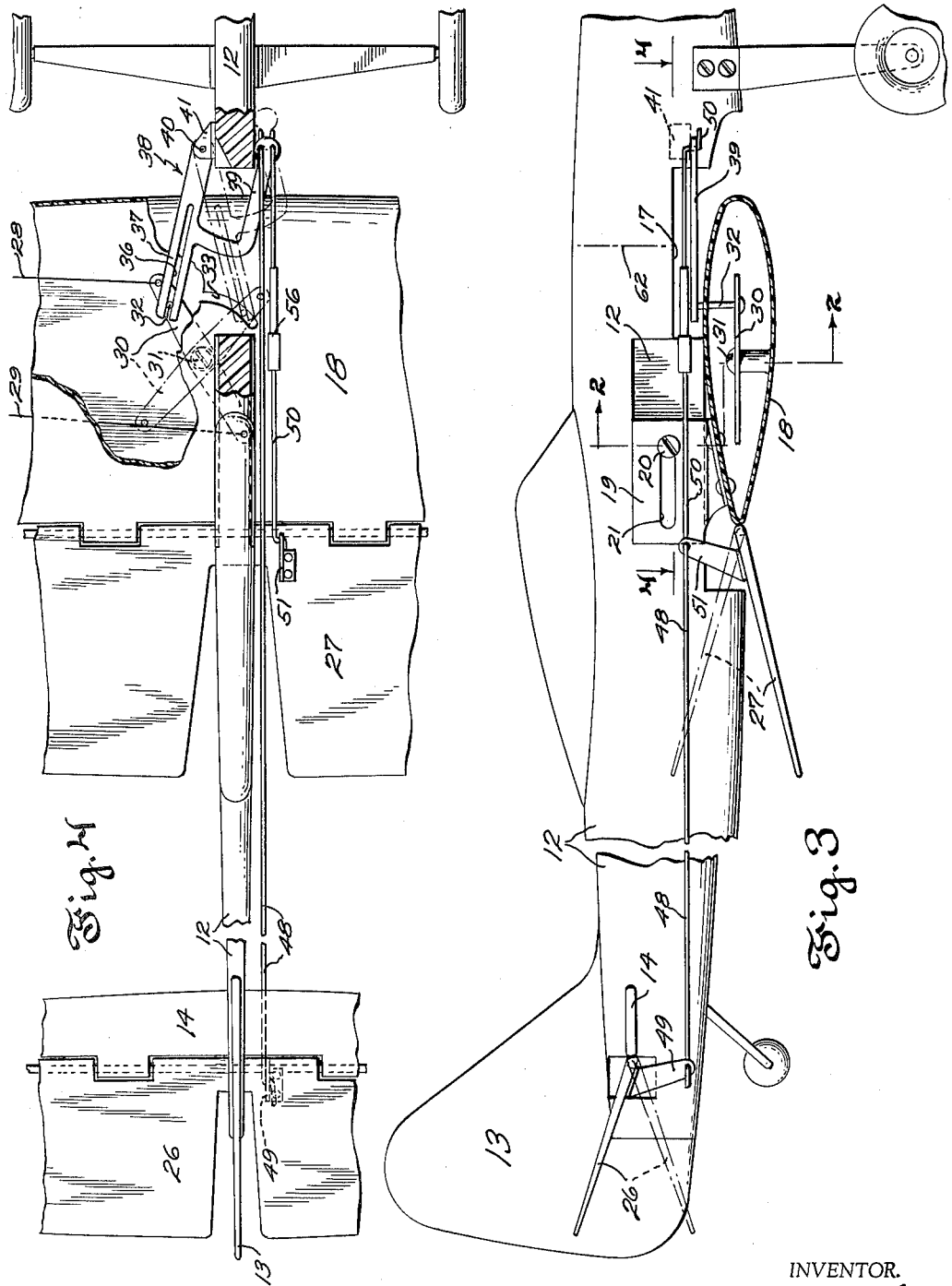

Dec. 14, 1965  H. STRUCK  3,222,815
TETHERED MODEL AIRPLANE FOR STUNT PERFORMANCE
Filed April 13, 1964  3 Sheets-Sheet 3

INVENTOR.
Henry Struck
BY
ATTORNEY.

3,222,815
TETHERED MODEL AIRPLANE FOR STUNT PERFORMANCE

Henry Struck, Hamburg, Conn., assignor to The A. C. Gilbert Company, New Haven, Conn., a corporation of Maryland
Filed Apr. 13, 1964, Ser. No. 359,324
8 Claims. (Cl. 46—77)

This invention relates to a model airplane equipped with means to shift the position of the wings adjustably in fore and aft relation to the fuselage for the main purpose of changing the ratio of the extent of an aileron movement that results from a given extent of differential pull manually applied to the usual two tethering control lines.

Accordingly an object of the invention is to cause the seesaw pull on the two tethering control lines to produce greater degrees of tilting of the ailerons of the plane by adjusting the wing relatively forward along the fuselage and to produce smaller degrees of such tilting by adjusting the wing relatively aft along the fuselage.

In the former condition there will be maximum maneuverability and greater stunt capability than in the latter condition so that by more skillful and expert handling of the control lines more spectacular flying performance can be produced and controlled.

A further object is by forward adjustment of the wing to bring the center of gravity of the plane relatively further aft on the wing chord which assists in producing greater sensitivity of response of the plane to maneuvering of the control lines.

These and other objects of the present improvements will become apparent in fuller detail from the following description of a successful embodiment of the invention having reference to the appended drawings wherein:

FIG. 3 is a side elevation of the plane of FIG. 1 showing the hollow wing in section with engine and propeller omitted.

FIG. 4 is a fragmentary plan view of the plane of FIG. 3 with parts thereof shown in section on the plane 4—4 in FIG. 3 to expose the improved control transmitting mechanism.

Figure 1:
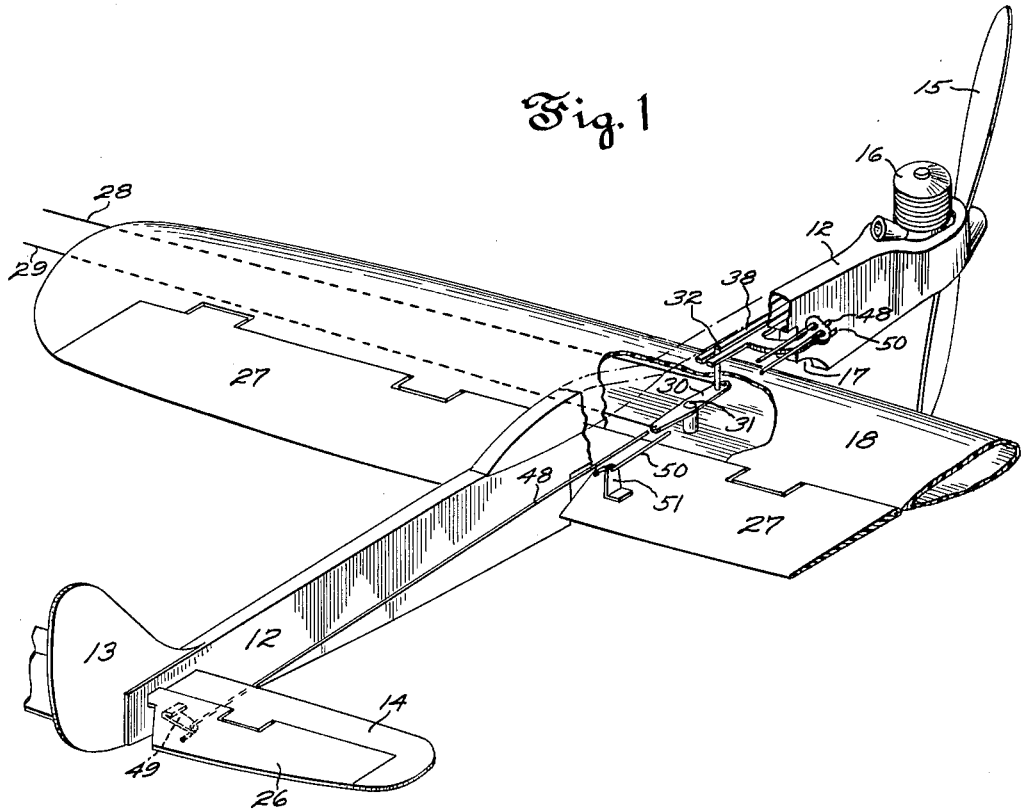
FIG. 1 is a top perspective view of a model airplane embodying the present improvements showing its wing and fuselage partially broken away to expose parts which transmit the pull of tethering control lines to ailerons of the plane.

In FIG. 1 the fuselage 12 of what may be termed a "stunt" plane is stripped to the simplicity of a bar-like body carrying a rudder 13 and stabilizer 14 at its trailing end together with a propeller 15 at its nose which is motorized by a miniature gasoline engine 16. Fuselage 12 has a cutaway 17 in its bottom edge elongated lengthwise thereof within which a hollow wing 18 is supported in crossing relation to the fuselage and adjustably attached thereto by a U-shaped bracket 19. This bracket is clamped to the sides of the fuselage by means of a screw 20 that threads into the body of the fuselage and passes through a horizontally elongate slot 21 in bracket 19. Thus wing 18 can be stationed on the fuselage at selective variable positions between its most aft position shown in FIGS. 3 and 4 and its most forward position shown in FIGS. 5 and 6.

Figure 5:
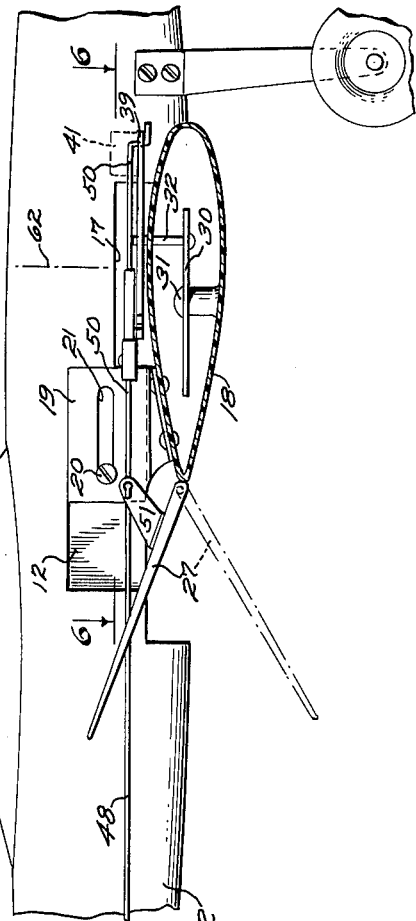
FIG. 5 is a view like FIG. 3 showing the wing adjusted to a farther forward position relative to the fuselage for increasing the flight maneuverability of the plane.

Stabilizer 14 carries the usual elevator 26 hinged thereto so as to be tiltable between its full line and broken line positions in FIGS. 3 and 5. Mechanism next to be described causes the degree of tilting of the elevator in response to control line manipulation to be varied according to changed settings of the wing fore or aft of the fuselage. It also causes corresponding variation in the responsive tilting of a wing flap 27.

For this purpose the seesaw pull on the tethering control lines 28 and 29 is directly imparted to a single straight rocking lever 30 to whose opposite ends the control lines are connected respectively. Lever 30 is located within the hollow of the wing and is pivotally mounted midway its length on the bottom wall of the wing at 31. Projecting upward from lever 30 is an actuating stud 32. Stud 32 is in constant slidable engagement with a straight slot 26 in one arm 37 of a yoke-shaped bellcrank 38 whose other arm 39 extends crosswise the before mentioned cutaway 17 in the bottom edge of fuselage 12. Stud 32 extends through an arcuate slot 33 in the top wall of wing 18.

Figure 2:
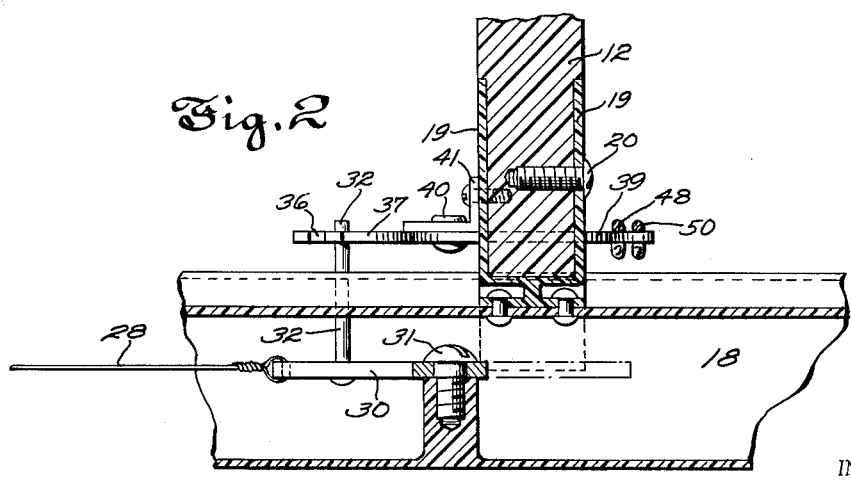
FIG. 2 is an enlarged view of the control transmitting mechanism taken in section on the planes 2—2 in FIG. 3, looking in the direction of the arrows.
Figure 6:
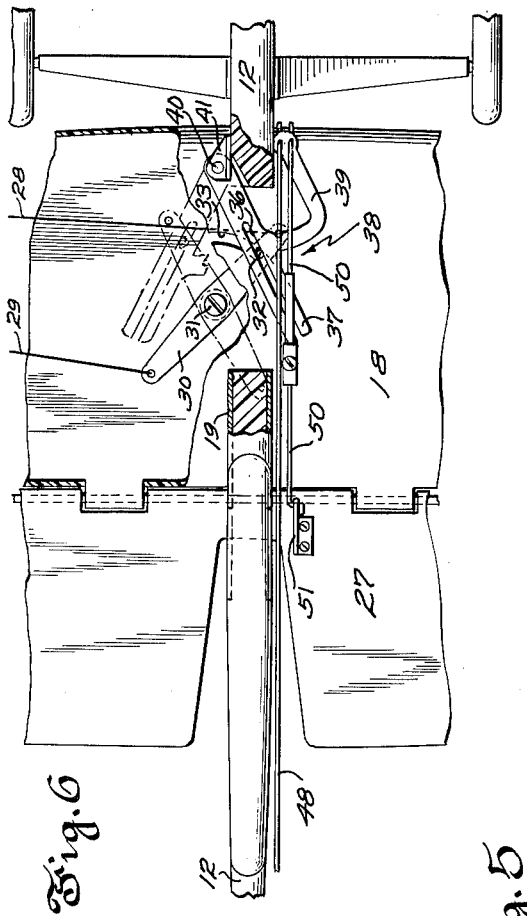
FIG. 6 is a fragmentary top plan view of the wing and fuselage of FIG. 5 with parts thereof shown in section on the plane 6—6 in FIG. 5, showing a change effected in the comparative extents of control movement transmitted from the tethering control lines to the ailerons in consequence of the adjusted position of the wing in FIG. 5.

Bellcrank 38 is pivotally mounted at 40 on a bracket 41 that is fixed on one side of the fuselage so that as the setting of the wing fore or aft of the fuselage is changed the distance between pivot 31 and pivot 40 becomes respectively increased or lessened with the result that in FIGS. 2, 5 and 6 a greater degree of swinging movement will be imparted to bellcrank 38 by a given degree of rocking of lever 30 than will be the case in FIGS. 3 and 4.

The swinging movement of bellcrank 38 is transmitted to the elevator 26 by a push-pull rod 48 whose rear end is pivotally connected to the horn 49 of the elevator and whose front end is pivotally connected to the end of yoke arm 39 of the bellcrank. Simultaneously the swinging of the bellcrank is transmitted to the wing flap or aileron 27 by a shorter push-pull rod 50 whose front end is pivotally connected to the horn 51 of the aileron and whose rear end is pivotally connected likewise to the end of yoke arm 39 of the bellcrank.

Figures 7, 8:
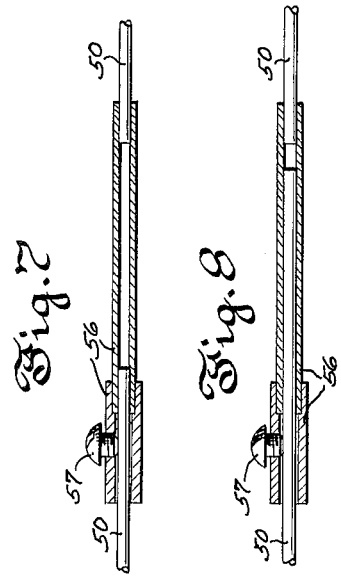
FIGS. 7 and 8 show differing adjustments of a coupling for lengthening or shortening a rod that operates an aileron to compensate for adjustments of the wing relative to the fuselage.

The length of push-pull rod 48 can be varied by use of an adjustable coupling illustrated in FIGS. 7 and 8 to correspond with respectively different conditions of wing adjustment. The coupling comprises a tubular connector 56 which spans a gap in the push-pull rod and has one end permanently and fixedly attached to one section of the length of the rod and its other end adjustably sleeved on the other section of the rod at the other side of the gap. A set screw 57 will maintain the adjustment referred to and thereby the effective length of the push-pull rod can be adjusted to accord with different settings of the distance between stabilizer 14 and the wing 18, sometimes termed airfoils herein. It will be noted that in FIG. 5 the center of gravity 62 of the plane lies further aft on the wing chord than in FIG. 3 and this also is conducive to greater sensitivity in response of its control lines.

In operation the wing 18 may first be set in such fore and aft position on the fuselage 12 as the operator's previous experience with the flying of tethered airplanes may dictate. If more than ordinarily spectacular or "stunt" flying performance of the plane is desired the adjustment of the wing may be made more like that in FIGS. 5 and 6 than like that in FIGS. 3 and 4. In FIGS. 5 and 6 the tilting of the elevator 26 and/or wing flap 27 will be of greater degree in proportion to seesawing manipulation of the tethering control lines 28, 29 and this gives the greater capability of stunt performance. The position of the wing in FIGS. 3 and 4 is suited to cruising performance of the plane.

The appended claims are directed to and intended to cover obvious equivalents of the parts and arrangements herein disclosed which are only one embodiment of the invention capable of attaining the desired result.

What is claimed is:

1. A model airplane adapted for stunt performance comprising in combination, a fuselage, a bellcrank pivotally mounted on said fuselage, airfoils projecting from said fuselage in rigid relation thereto at least one of which airfoils is adjustable to selective distances from the other airfoil longitudinally of said fuselage, a control aileron hinged to one of said airfoils, tethering control lines, a rockable lever having opposite ends connected respectively to said control lines and pivotally mounted on said adjustable airfoil having means operably related to said bellcrank in a manner to cause transmission of movement from said lever to said bellcrank with variable leverage when the distance between said airfoils is changed, and means operatively relating another arm of said bellcrank to said aileron.

2. A model airplane as defined in claim 1, in which the said airfoils comprise a wing and the stabilizer of the airplane, and the said aileron comprises the elevator of the airplane.

3. A model airplane as defined in claim 1, in which the said airfoils comprise a wing and the stabilizer of the airplane, and the said aileron comprises a flap hinged to said wing.

4. A model airplane as defined in claim 3, together with an elevator hinged to the said stabilizer, and means operatively relating the said other arm of the said bellcrank to said elevator.

5. A model airplane as defined in claim 3, in which the said means operatively relating the said bellcrank to the said wing flap is adjustable in length by means of a telescopic coupling.

6. A model airplane as defined in claim 1, in which the said rockable lever and the said one arm of the said bellcrank have pin-and-slot engagement for transmitting movement from the former to the latter with variable leverage.

7. A model airplane as defined in claim 1, in which the said other arm of the said bellcrank is yoke-shaped and extends from one side to the other side of the said fuselage crosswise thereof.

8. A model airplane as defined in claim 1, in which the said adjustable airfoil comprises a hollow wing of the airplane, and the said rockable lever is contained within the hollow of said wing.

References Cited by the Examiner
UNITED STATES PATENTS

| | | | |
|---|---|---|---|
| 2,611,213 | 9/1952 | Johnson et al. | 46—77 |
| 2,724,211 | 11/1955 | Bloom | 46—79 |
| 3,110,126 | 11/1963 | Kretzmer | 46—77 |

RICHARD C. PINKHAM, *Primary Examiner.*